United States Patent [19]
Schnabel

[11] Patent Number: 6,166,819
[45] Date of Patent: Dec. 26, 2000

[54] SYSTEM AND METHODS FOR OPTICALLY MEASURING DIELECTRIC THICKNESS IN SEMICONDUCTOR DEVICES

[75] Inventor: Rainer Florian Schnabel, Wappingers Falls, N.Y.

[73] Assignee: Siemens Aktiengesellschaft, Munich, Germany

[21] Appl. No.: 09/105,632

[22] Filed: Jun. 26, 1998

[51] Int. Cl.[7] ....................................................... G01B 9/02
[52] U.S. Cl. .............................................................. 356/504
[58] Field of Search ................................... 356/357, 345, 356/504, 503

[56] References Cited

U.S. PATENT DOCUMENTS 4,984,894  1/1991  Kondo ...................................... 356/382
5,473,431  12/1995  Hollars et al. ........................... 356/355

*Primary Examiner*—Robert Kim
*Assistant Examiner*—Andrew H. Lee

[57] ABSTRACT

A method for optically measuring layer thickness in accordance with the present invention includes the steps of providing a first metal layer on a semiconductor device structure, providing a second metal layer on the first metal layer, forming a dielectric layer over the second metal layer and directing light onto the structure such that light reflected from a surface of the dielectric layer and a surface of the second metal layer create an interference pattern from which the dielectric layer thickness is measured. A system for optically measuring layer thickness includes a semiconductor device to be measured. The semiconductor device includes a first metal layer, a second metal layer disposed on the first metal layer, the second metal layer having an arcuate shaped top surface and a dielectric layer disposed on the second metal layer. A means for directing and receiving light is also included wherein light is directed onto the semiconductor device such that light reflected from a surface of the dielectric layer and a surface of the second metal layer creates an interference pattern from which the dielectric layer thickness is measured.

8 Claims, 2 Drawing Sheets

SYSTEM AND METHODS FOR OPTICALLY MEASURING DIELECTRIC THICKNESS IN SEMICONDUCTOR DEVICES

BACKGROUND

1. Technical Field

This disclosure relates to semiconductor devices and more particularly, to a method and system for optically measuring dielectric layer thickness over metals or other reflective materials.

2. Description of the Related Art

Semiconductor devices utilize damascene metalization to form various conductive paths. In semiconductor memory devices, interconnects are sometimes formed using a damascene or a dual damascene layer. Damascene layers are used to provide a reflective surface for measurement of dielectric layers deposited thereon.

Where damascene or dual damascene is applied to form a given layer, a maximum linewidth is restricted by design rules to values of about 1 to 5 microns. This is due to chemical mechanical polishing (CMP) which causes metal lines to dish.

Referring to FIG. 1, a conventional memory device is shown having metal lines 10 formed in trenches 12 of a dielectric layer 16. Another dielectric layer 14 is deposited over metal lines 10. It is important to be able to measure the thickness of dielectric layer 14. Measurement of thickness of layers in semiconductor devices is often performed using optical interference methods. As shown in FIG. 2, light (indicated by arrow "A") falls incident on a surface 20 of a layer 22. Part of the light is reflected and part is transmitted when surface 20 is reached. The transmitted part continues to propagate through layer 22 until an interface 24 is reached. Then part of the light is reflected and part transmitted. Since reflected portions "B" and "C" of the light from surface 20 and interface 24, respectively have the same wavelength and are parallel, an interference pattern can be obtained in which phase shifts and other physical properties can be measured. Once the appropriate properties have been obtained the thickness of layer 22 may be determined.

Referring to FIG. 3, as mentioned above linewidths (w) are restricted to around 1–5 microns. The reason for this is due to increased dishing during CMP. Dishing is indicated in FIG. 3 by a bowed top surface 30 of metal lines 32. The larger the line width the more pronounced the dishing as shown in FIGS. 3 and 4. FIG. 3 shows dishing for metal lines 32 having a small linewidth, and FIG. 4 shows dishing for metal lines 34 having a larger line width. In a worst case, the cross-section of metal lines 36 is decreased to the point where all metal is removed from center portions 38 of the damascene metal lines as shown in FIG. 4.

One difficulty associated with dishing is how to measure the thickness of a dielectric layer deposited on top of the damascene metal by optical means as described above. Optical interference measurements are performed over a large field, typically 50 to 100 microns in width for metals that can be reactively ion etched (i.e. non-damascene metals). Applying the same type of optical measurements is not possible for damascene or dual damascene metals due to the fact that the damascene metal is almost totally removed in 500 nm deep trenches of widths greater than 10 microns due to CMP.

For optical measurements, a metal line width of about 20 to 30 microns is required. Attempts to "break up" metal lines into smaller "stripes", for example, 5 microns in width, to make metal lines less subjected to dishing and increase the field width have not been successful. The smaller "stripes" disturb optical interference patterns thereby reducing the accuracy of the dielectric thickness measurement.

Therefore, a need exists for a method of measuring a dielectric layer thickness wherein the dielectric layer is on top of a damascene metal.

SUMMARY OF THE INVENTION

A method for optically measuring layer thickness in accordance with the present invention includes the steps of providing a first metal layer on a semiconductor device structure, providing a second metal layer on the first metal layer, forming a dielectric layer over the second metal layer and directing light onto the structure such that light reflected from a surface of the dielectric layer and a surface of the second metal layer create an interference pattern from which the dielectric layer thickness is measured.

In particularly useful methods, the second metal layer is preferably a damascene metal or a dual damascene metal. The second metal layer may include metal lines, and the metal lines may include a width of about 20 microns or greater. The step of providing the second metal layer may include the step of providing a second metal layer with an arcuate shaped top surface. The first metal layer may include one of contacts and vias. The light may have a wavelength between about 200 nm and about 800 nm.

A method for determining thickness of dielectric layers formed on metals in semiconductor devices includes the steps of providing a substrate having a first layer formed thereon, the first layer including metal connections to active areas of the substrate, forming a first dielectric layer on the first layer, etching trenches in the first dielectric layer such that the trenches substantially coincide with the metal connections, depositing a metal in the trenches to form metal lines, polishing the metal, depositing a second dielectric layer on the metal and the first dielectric layer and directing light onto the metal connections such that light reflected from a surface of the second dielectric layer and a surface of the metal lines create an interference pattern from which the second dielectric layer thickness is measured.

In other particularly useful methods, the metal may include one of a damascene metal and a dual damascene metal. The semiconductor device may be a memory chip and the metal lines may be one of wordlines and bitlines. The metal lines may include a width of about 20 microns or greater. The step of polishing the metal may include forming an arcuate shaped top surface on the metal as a result of the polishing. The metal connections may include one of a contact and a via. The light has a wavelength preferably between about 200 nm and about 800 nm.

A system for optically measuring layer thickness includes a semiconductor device to be measured. The semiconductor device includes a first metal layer, a second metal layer disposed on the first metal layer, the second metal layer having an arcuate shaped top surface and a dielectric layer disposed on the second metal layer. A means for directing and receiving light is also included wherein light is directed onto the semiconductor device such that light reflected from a surface of the dielectric layer and a surface of the second metal layer creates an interference pattern from which the dielectric layer thickness is measured.

In alternate embodiments, the means for directing and receiving light may include a light source for directing light at a predetermined angle relative to the surface of the dielectric layer. The means for directing and receiving light may include a photosensor for measuring light intensity of reflected light for the semiconductor device. The light preferably has a wavelength between about 200 nm and about 800 nm. The semiconductor device may include a memory chip.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

This disclosure relates to semiconductor devices and more particularly, to a method and system for optically measuring dielectric layer thickness over reflective materials, for example, metals. The present invention provides a method for using optical interference methods for measuring dielectric layers over structures which have experienced dishing as described above. The structures may include reflective materials including, but not limited to metals. The dishing problem is of particular concern when the structures are damascene or dual damascene metals. The invention is particularly useful for memory chips, for example, DRAM chips (dynamic random access memory).

Figure 1:
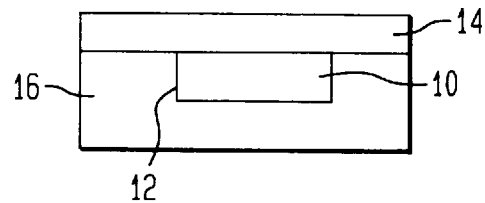
FIG. 1 is a cross-sectional view of a semiconductor device showing a dielectric layer having metal lines therebelow in accordance with the prior art.
Figure 2:
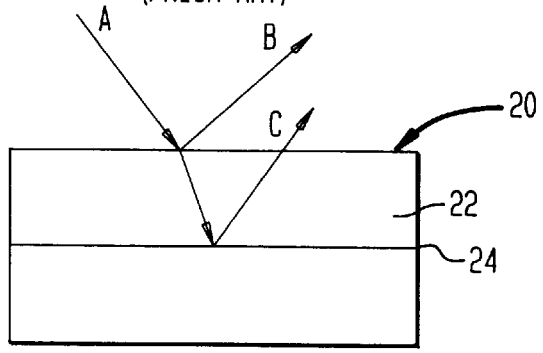
FIG. 2 is a cross-sectional view of layers showing a optical measurement in accordance with the prior art.
Figure 3:
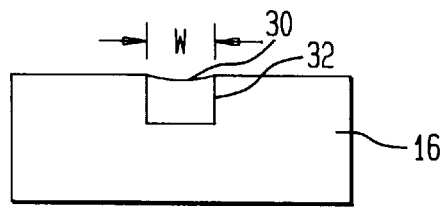
FIG. 3 is cross-sectional view of a semiconductor device after polishing having metal lines with a small width in accordance with the prior art.
Figure 4:
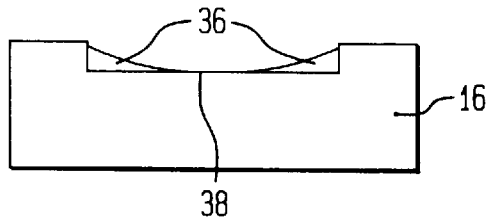
FIG. 4 is cross-sectional view of a semiconductor device after polishing showing metal lines with a center portion removed due to the polishing in accordance with the prior art.
Figure 5:
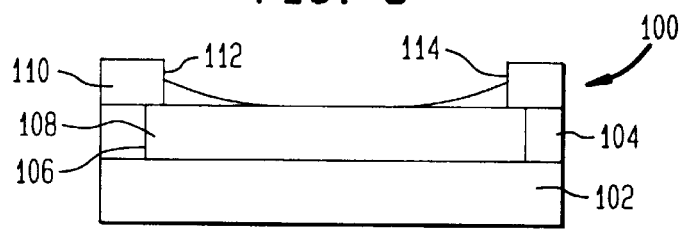
FIG. 5 is cross-sectional view of a semiconductor device after polishing having dished metal lines in accordance with the present invention.

Referring now in specific detail to the drawings in which like reference numerals identify similar or identical elements throughout the several views, FIG. 5 shows a portion of a semiconductor device 100. Semiconductor device 100 includes a device layer 102. Device layer 102 includes a substrate and devices. Devices may include capacitors, for example trench capacitors and/or transistors, for example field effect transistors. These devices utilize one or more diffusion regions including dopants for providing semiconduction as known to those skilled in the art.

A dielectric layer 104 is formed on device layer 102. Dielectric layer 104 is patterned using known processes and holes or trenches 106 are formed therethrough preferably by an etching process. Holes 106 are filled with a conductive material, preferably a metal to form vias or contacts 108. Vias 108 couple to diffusion regions and provide connections to higher metal layers such that devices on device layer 102 may be accessed and activated. Vias 108 are formed by depositing a metal layer on top of dielectric layer 104. The metal layer is then etched or polished to a predetermined height.

After forming vias 108, a dielectric layer 110 is deposited over dielectric layer 104 and vias 108. Dielectric layer 110 is patterned and etched to form trenches 112. A conductive layer is deposited in trenches 112 and over a surface of dielectric layer 110. Conductive layer forms conductive structures 114, for example metal lines for providing interconnects to devices on semiconductor device 100 or off chip devices through vias 108 and more particularly metal lines may include wordlines or bitlines for semiconductor memory devices. Conductive structures 114 are preferably damascene metals or dual damascene metals. Damascene and dual damascene metals may include Ti, W, Cu, Ta, TaN, TiN or combination thereof Damascene metals are deposited using a chemical vapor deposition (CVD) process, a physical vapor deposition (PVD) process and/or a plating process. The damascene process includes a first material deposition, for example a dielectric material, forms trenches in the deposited material and the metal is deposited in the trenches. Liner materials may be used and deposited prior to main metal material as is known in the art.

Conductive layer is removed from the surface of dielectric layer 110 by a CMP process. This process creates dishing in conductive structures 114 as shown in FIG. 5.

Figure 6:
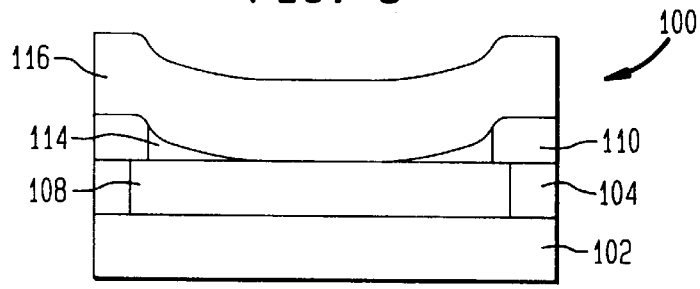
FIG. 6 is cross-sectional view of the semiconductor device of FIG. 5 after a dielectric layer has been deposited thereon in accordance with the present invention.

Referring to FIG. 6, a dielectric layer 116 is deposited on conductive structures 114 and on dielectric layer 110. Dielectric layer 116, preferably includes a silicon oxide, for example TEOS or silane oxide. Since dielectric layer 116 is deposited, dielectric layer 116 conforms to the surface fairly consistently to which dielectric layer 116 is deposited. In other words, dielectric layer 116 repeats a topology of conductive structures 114 and dielectric layer 110 therebelow. Hence, dielectric layer 116 has a same thickness over semiconductor device 100.

Figure 7:
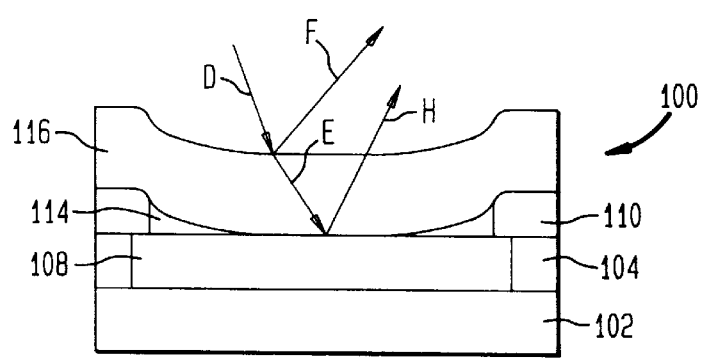
FIG. 7 is cross-sectional view of the semiconductor device of FIG. 6 showing light interactions for measuring the dielectric layer thickness in accordance with the present invention.

Referring to FIG. 7, exploiting the fact that dielectric layer 116 has the same thickness, an optical interference measurement may be taken in accordance with the present invention. Instead of relying on a surface of conductive structures 114 which is inconsistent due to dishing, a much larger depth of field may be used to ensure some metal will be left to reflect back incident light. The depth of field used for the optical interference measurement includes light, indicated by arrow "D", which enters dielectric layer 116 and is refracted, as shown by arrow "E", and a portion is reflected, as shown by arrow "F". Light which enters dielectric layer 116 penetrates to a depth of via 108. Light reflected from via 108 or in the alternative a deeper portion of a conductive structure 114, for example a portion close to vias 108 as in the case where dishing does not reach the depth of vias 108, is indicated by arrow "H". Light indicated by "F" and "H" interfere to form an interference pattern from which the depth of dielectric layer 116 may be measured. In a preferred embodiment, light has a wavelength of between about 200 nm to about 800 nm, and more preferably between about 700 nm and about 800 nm. Light of a single wavelength or a range of wavelengths may be used. As described above, a width of a field for conducting such a measurement is about 20 to 30 microns. Therefore, restrictive design rules for limiting linewidth to reduce dishing are no longer as important. Further, accurate optical interference measurements can be obtained for dielectric layer depth over dished metal lines, for example dished damascene and dual damascene metal lines.

Figure 8:
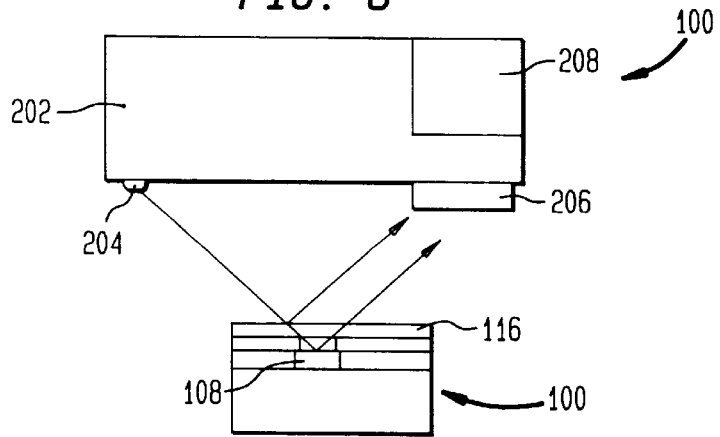
FIG. 8 is cross-sectional view of a system for measuring dielectric layer thickness in accordance with the present invention.

Referring to FIG. 8, a system 200 for measuring dielectric layer thickness is shown. An optical measurement device 202 includes a light source 204 and a photosensor 206 for measuring an intensity field of reflected light from semiconductor device 100. Light source 204 directs light at an angle which does not exceed a critical angle such that part of the light is reflected and part of the light is transmitted. The transmitted part travels to the depth of vias 108 and is reflected as described above. Reflected light creates an intensity field that varies with position. By counting fringes in the interference pattern, (which are multiples of the light's wavelength) a thickness for dielectric layer 116 is obtained. Other techniques are also contemplated for optical measurement. A processor 208 may be included for processing intensity data of the reflected light to assist in obtaining the intensity field. Optical measurement devices include interferometric thickness measurement tools which are commercially available.

Having described preferred embodiments for a method and system for optically measuring dielectric thickness (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for optically measuring dielectric layer thickness, comprising the steps of:

providing a first metal layer on a semiconductor device structure;

providing a second metal layer on the first metal layer, the second metal layer having an arcuate shaped top surface;

forming a dielectric layer over the second metal layer wherein the dielectric layer includes a thickness that conforms to the arcuate shaped top surface; and directing light through a region of the second metal layer thinned enough to permit light onto the first metal layer such that light reflected from a surface of the dielectric layer and a surface of the first metal layer create an interference pattern from which the dielectric layer thickness is measured.

2. The method as recited in claim 1, wherein the second metal layer is a damascene metal.

3. The method as recited in claim 1, wherein the second metal layer is a dual damascene metal.

4. The method as recited in claim 1, wherein the second metal layer includes metal lines.

5. The method as recited in claim 4, wherein the metal lines include a width of about 20 microns or greater.

6. The method as recited in claim 1, wherein the step of providing the second metal layer includes the step of providing a second metal layer with an arcuate shaped top surface.

7. The method as recited in claim 1, wherein the first metal layer includes one of contacts and vias.

8. The method as recited in claim 1, wherein the light has a wavelength between about 200 nm and about 800 nm.

* * * * *